United States Patent
Shin et al.

(10) Patent No.: US 8,750,650 B2
(45) Date of Patent: Jun. 10, 2014

(54) SILICON BASED OPTICAL MODULATORS INCLUDING VERTICAL SLABS AND METHODS OF FORMING

(75) Inventors: Dong Jae Shin, Seoul (KR); Jung Hyung Pyo, Seoul (KR); Kwang Hyun Lee, Hwaseong-si (KR); Kyoung Ho Ha, Seoul (KR); Ho-Chul Ji, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 279 days.

(21) Appl. No.: 13/232,635

(22) Filed: Sep. 14, 2011

(65) Prior Publication Data

US 2012/0070111 A1 Mar. 22, 2012

(30) Foreign Application Priority Data

Sep. 17, 2010 (KR) .................. 10-2010-0091583

(51) Int. Cl.
| | | |
|---|---|---|
| *G02F 1/035* | (2006.01) | |
| *G02F 1/017* | (2006.01) | |
| *G02F 1/015* | (2006.01) | |
| *G02B 6/10* | (2006.01) | |
| *G02F 1/00* | (2006.01) | |
| *G02F 1/01* | (2006.01) | |

(52) U.S. Cl.
CPC ........ *G02F 1/01708* (2013.01); *G02F 1/01725* (2013.01); *G02F 1/015* (2013.01); *G02F 1/0054* (2013.01); *G02F 1/01* (2013.01); *G02F 1/011* (2013.01); *G02F 2202/10* (2013.01)
USPC .............................................. 385/2; 385/129

(58) Field of Classification Search
CPC . G02F 1/015; G02F 1/01708; G02F 1/01725; G02F 1/0054; G02F 1/01; G02F 1/011; G02F 1/0134; G02F 2202/10; G02F 1/101–1/108; G02F 2202/101–2202/108
USPC ......... 385/2, 37, 129–132; 359/240, 248, 279
See application file for complete search history.

(56) References Cited

U.S. PATENT DOCUMENTS

| | | | |
|---|---|---|---|
| 6,584,239 B1 * | 6/2003 | Dawnay et al. ................... | 385/2 |
| 6,687,425 B2 | 2/2004 | Ridgway et al. | |

(Continued)

FOREIGN PATENT DOCUMENTS

| | | | |
|---|---|---|---|
| GB | 2477935 A | * | 8/2011 |
| KR | 1020070040942 A | | 4/2007 |

OTHER PUBLICATIONS

Dong et al., "All-optical compact silicon comb switch," School of Electrical and Computer Engineering, Cornell University, Ithaca, NY 14853, vol. 15, No. 15, Jul. 23, 2007, 6 pages.

(Continued)

*Primary Examiner* — Rhonda Peace
(74) *Attorney, Agent, or Firm* — Myers Bigel Sibley & Sajovec, P.A.

(57) ABSTRACT

An optical modulator structure can include a core region that comprises an optical transmission path having a refractive index that is modulated via electric charge introduced into the core region. A plurality of first vertical slabs comes into contact with and is spaced along a first side of the core region to provide a first path for the electric charge to/from the core region. A plurality of second vertical slabs come into contact with and is spaced along a second side of the core region, that is opposite to the first side, to provide a second path for the electric charge to/from the core region. Other structures and methods are disclosed.

30 Claims, 23 Drawing Sheets

(56) References Cited

U.S. PATENT DOCUMENTS

| | | | |
|---|---|---|---|
| 6,785,435 B2* | 8/2004 | Ridgway et al. | 385/14 |
| 7,116,853 B2* | 10/2006 | Gunn et al. | 385/14 |
| 7,251,408 B1* | 7/2007 | Gunn et al. | 385/132 |
| 7,440,666 B2* | 10/2008 | Bour et al. | 385/129 |
| 7,526,146 B1* | 4/2009 | Hsu | 385/2 |
| 7,532,777 B2* | 5/2009 | Mitomi et al. | 385/2 |
| 7,657,131 B2 | 2/2010 | Liu et al. | |
| 7,941,024 B2* | 5/2011 | Bour et al. | 385/129 |
| 7,995,267 B2* | 8/2011 | Satoh et al. | 359/326 |
| 8,252,670 B2* | 8/2012 | Fedeli | 438/513 |
| 8,259,386 B2* | 9/2012 | Satoh et al. | 359/326 |
| 8,422,841 B1* | 4/2013 | Shi et al. | 385/37 |
| 2003/0133658 A1* | 7/2003 | Liu et al. | 385/37 |
| 2003/0142943 A1* | 7/2003 | Yegnanarayanan et al. | 385/131 |
| 2006/0008223 A1* | 1/2006 | Gunn et al. | 385/129 |
| 2006/0171650 A1* | 8/2006 | Mendoza et al. | 385/132 |
| 2007/0280309 A1* | 12/2007 | Liu | 372/26 |
| 2008/0037926 A1* | 2/2008 | Mendoza et al. | 385/11 |
| 2008/0304598 A1 | 12/2008 | Yan et al. | |
| 2009/0263078 A1* | 10/2009 | Hosomi et al. | 385/14 |
| 2011/0211786 A1* | 9/2011 | Ushida et al. | 385/2 |
| 2012/0070111 A1* | 3/2012 | Shin et al. | 385/2 |
| 2013/0058606 A1* | 3/2013 | Thomson et al. | 385/14 |
| 2013/0064491 A1* | 3/2013 | Fujikata et al. | 385/2 |
| 2013/0188902 A1* | 7/2013 | Gardes et al. | 385/2 |

OTHER PUBLICATIONS

Lee et al., "All-Optical Comb Switch for Multiwavelength Message Routing in Silicon Photonic Networks," IEEE Photonics Technology Letters, vol. 20, No. 10, May 15, 2008, p. 767-769.

* cited by examiner

Prior Art

ND VERTICAL SLABS AND
SILICON BASED OPTICAL MODULATORS INCLUDING VERTICAL SLABS AND METHODS OF FORMING

This application claims priority under 35 U.S.C. §119 to Korean Patent Application No, 10-2010-0091583, filed on Sep. 17, 2010, in the Korean Intellectual Property Office, the disclosure of which is incorporated herein in its entirety by reference.

BACKGROUND

The present inventive concept relates optoelectronic modulators, and more particularly, to silicon based optoelectronic modulators and, methods of forming the same.

In general, an optical modulator can include an optical modulator for modulating the phase of an optical signal. The optical modulator can include an optical waveguide core region for transmitting an optical signal and a charge path for injecting a charge, e.g., an electron and a hole, into the optical waveguide core region. In some optical modulators, a lateral slab is provided at a lower portion of the optical waveguide core region to introduce a thin charge path to the core region, to reduce the affect of the charge on the operation of the optical waveguide core region.

SUMMARY

Embodiments according to the inventive concept can provide silicon based optical modulator structures including vertical slabs and methods of forming optical modulator structures including vertical slabs. Pursuant to these embodiments, an optical modulator structure can include a core region that comprises an optical transmission path having a refractive index that is modulated via electric charge introduced into the core region, A plurality of first vertical slabs comes into contact with and is spaced along a first side of the core region to provide a first path for the electric charge to/from the core region. A plurality of second vertical slabs come into contact with and is spaced along a second side of the core region, that is opposite to the first side, to provide a second path for the electric charge to/from the core region.

In some embodiments according to the inventive concept, an optical modulator structure can include a plurality of vertical slabs that are configured to inject charge into a core region that is located between ones of the plurality of vertical slabs, where both the core region and the vertical slabs are formed as a single unitary structure.

In some embodiments according to the inventive concept, a method of forming an optical modulator structure can be provided by simultaneously forming a core region, and pluralities of first and second vertical slabs, wherein the core region comprises an optical transmission path having a refractive index that is modulated via electric charge introduced into the core region. The plurality of first vertical slabs come into contact with and are spaced along a first side of the core region to provide a first path for the electric charge to/from the core region. The plurality of second vertical slabs come into contact with and are spaced along a second side of the core region, that is opposite to the first side, to provide a second path for the electric charge to/from the core region.

In some embodiments according to the inventive concept, a method of forming an optical modulator structure can be provided by forming a trench in a substrate and forming a lower cladding layer in the trench. An amorphous Si layer can be formed on the lower cladding layer. The amorphous Si layer can be patterned using a single mask to simultaneously define a core region pattern and pluralities of first and second vertical slab patterns on the amorphous Si layer. The amorphous Si layer can be etched to form a core region and a plurality of first vertical slabs on a first side of the core region and a plurality of second vertical slabs on a second side of the core region opposite the first side. An upper cladding layer can be deposited on the core region and on the pluralities of first and second vertical slabs.

DESCRIPTION OF EMBODIMENTS ACCORDING TO THE INVENTIVE CONCEPT

Figure 1:
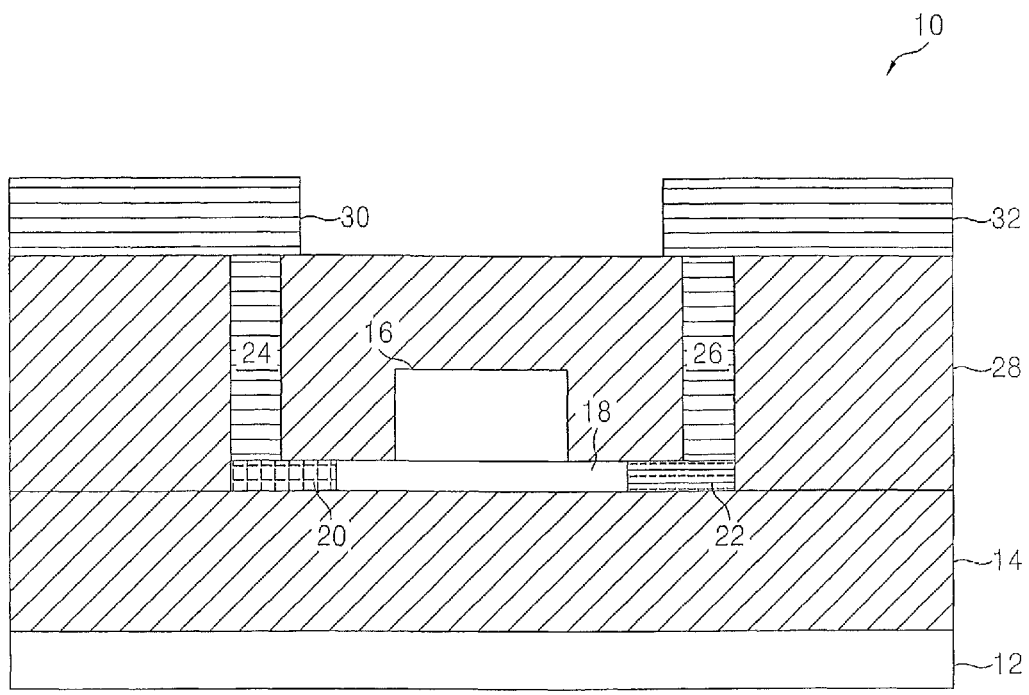
FIG. 1 shows a cross-sectional view of an optical modulator structure.

The present inventive concept will now be described more fully with reference to the accompanying drawings, in which embodiments of the inventive concept are shown. The inventive concept may, however, be embodied in many different forms and should not be construed as being limited to the embodiments set forth herein; rather, these embodiments are provided so that this disclosure will be thorough and complete, and will fully convey the inventive concept to those skilled in the art. In the drawings, the thicknesses of layers and regions are exaggerated for clarity. Like reference numerals in the drawings denote like elements; and thus their description will be omitted.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein.

As used herein, the term "optical modulator" includes structures that operate according to an Electro-optic effect to modulate a beam of light in response to an electrical control signal. As used herein, the term "vertical" includes orientations that are perpendicular to lateral.

FIG. 1 shows a cross-sectional view of an optical modulator structure having a conventional structure.

Referring to FIG. 1, an optical modulator structure 10 having a lateral p-doped region-intrinsic (or insulating) region-n-doped region (PIN) structure includes a first semiconductor substrate 12, a lower cladding layer 14 formed on an upper surface of the first semiconductor substrate 12, an optical waveguide core region 16 for transmitting an optical signal, a lateral slab 18 formed beneath the optical waveguide core region 16, a p-doped region 20, a n-doped region 22, a first metal electrode 24 connected to the p-doped region 20, a second metal electrode 26 connected to the n-doped region 22, an upper cladding layer 28, a first electrode pad 30 connected to the first metal electrode 24 and a second electrode pad 32 connected to the second metal electrode 26.

A voltage +V supplied from a power source is provided to the first electrode pad 30 and a reference voltage, GND, is supplied to the second electrode pad 32. The refractive index of the optical waveguide core region 16 varies based on the voltage +V supplied to the first electrode pad 30 and the reference voltage GND supplied to the second electrode pad 32.

The upper cladding layer 28 surrounds the optical waveguide core region 16, the lateral slab 18, the p-doped region 20, the n-doped region 22, the first metal electrode 24 and the second metal electrode 26.

The lower cladding layer 14 and the upper cladding layer 28 may comprise an insulating material, such as silicon dioxide (SiO2), and the optical waveguide core region 16 and the slab 18 may comprise an intrinsic silicon (Si).

In operation, holes supplied from the power source and electrons, supplied from the GND, are injected into the optical waveguide core region 16 through the lateral slab 18 to vary a refractive index of the optical waveguide core region 16. Varying the refractive index can cause an optical signal transmitted via the optical waveguide core region 16 to be delayed relative to the same optical signal transmitted via another optical waveguide core region that is not associated with a respective optical modulator structure.

As appreciated by the present inventors, according to FIG. 1, the lateral slab 18 is separate from the optical waveguide core region 16, and is formed using a different mask than that used to form the optical waveguide core region 16. In addition, as appreciated by the present inventors, since the height (or thickness) of the optical waveguide core region 16 is different from the height (or thickness) of the lateral slab 18, the optical waveguide core region 16 and the lateral slab 18 may not be formed at the same time according to the conventional approach.

Figure 2:
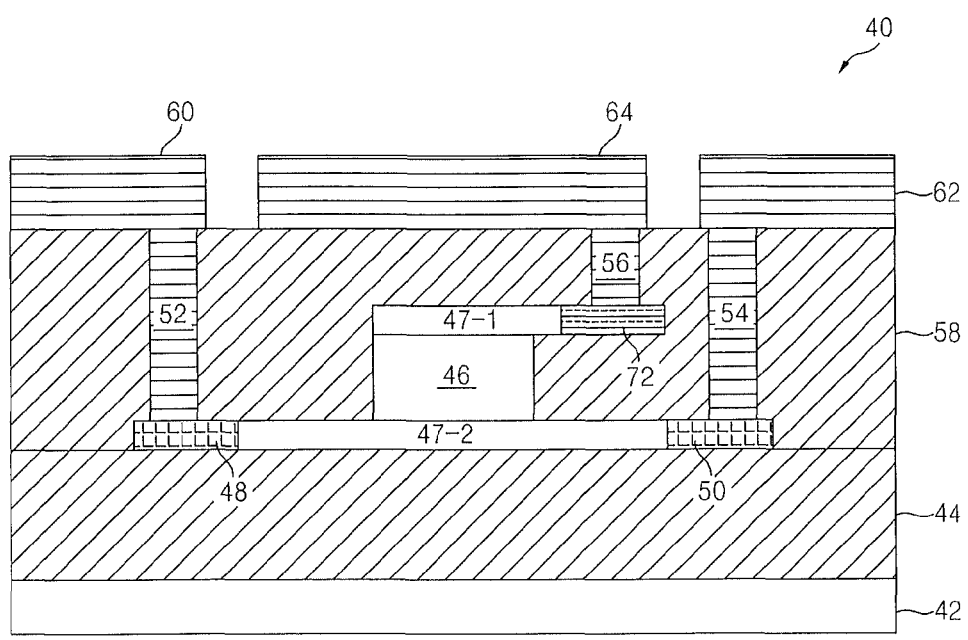
FIG. 2 shows a cross-sectional view of an optical modulator structure.

FIG. 2 shows a cross-sectional view of an optical modulator structure having a vertical PIN structure.

Referring to FIG. 2, the optical modulator structure 40 having the vertical PIN structure includes a first semiconductor substrate 42, a lower cladding layer 44 on an upper surface of the first semiconductor substrate 42, an optical waveguide core region 46 for transmitting an optical signal, a first lateral slab 47-1 above and contacting the optical waveguide core region 46 and a second lateral slab 47-2 below and contacting the optical waveguide core region 46. The optical modulator structure further includes two p-doped regions 48 and 50, a n-doped region 72, first and second metal electrodes 52 and 54, connected to each of the p-doped regions 48 and 50, respectively, a metal electrode 56 connected to the n-doped region 72, an upper cladding layer 58, a first electrode pad 60 and a second electrode pad 62.

The upper cladding layer 58 surrounds the optical waveguide core region 46, the lateral slabs 47-1 and 47-2, the p-doped regions 48 and 50, the n-doped region 52 and the metal electrodes 52, 54 and 56.

In operation, the holes supplied from the power source and the electrons supplied from the ground are injected to the optical waveguide core region 46 through the lateral slabs 47-2 and 47-1, respectively.

According to FIG. 2, as appreciated by the present inventors, to form the lateral slabs 47-1 and 47-2, a plurality of masks are needed in addition to a separate mask used to form the optical waveguide core region 46. As further appreciated by the present inventors, since the height of the optical waveguide core region 46 is different from the height of lateral slabs 47-1 and 47-2, the optical waveguide core region 46 and lateral slabs 47-1 and 47-2 may be not formed at the same time as a single etching process according to the conventional approach.

Figure 3:
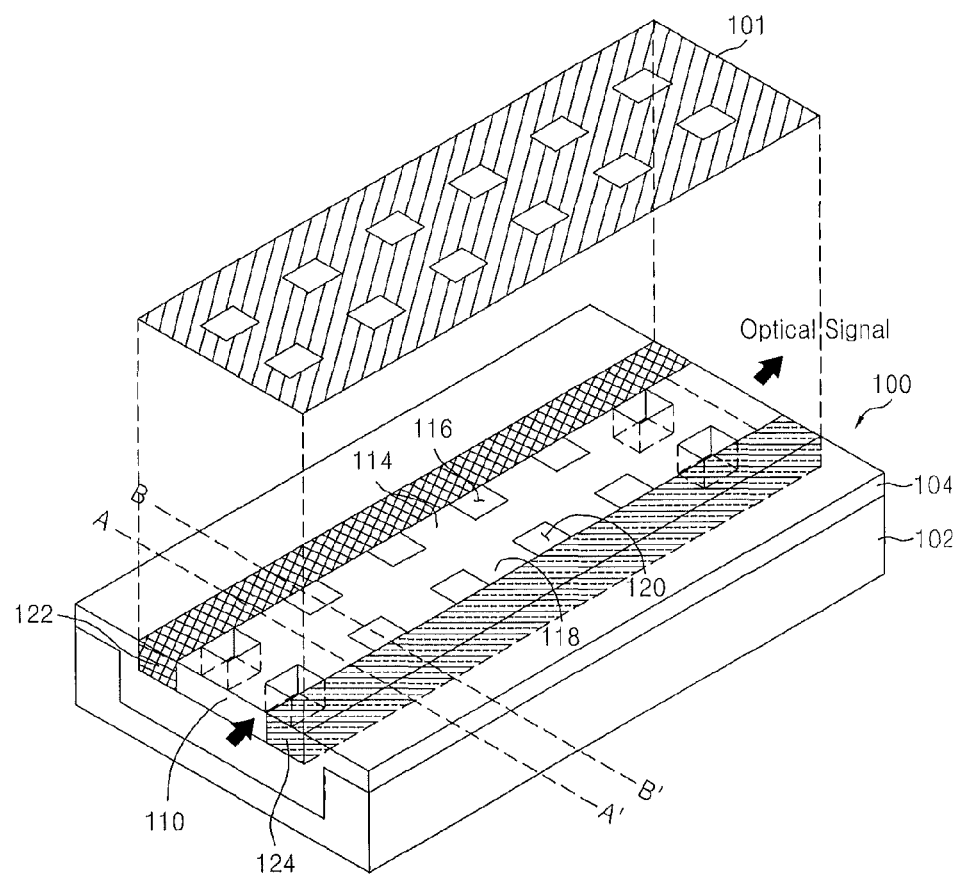
FIG. 3 shows a perspective view of an optical modulator structure in some embodiments according to the inventive concept.
Figure 4:
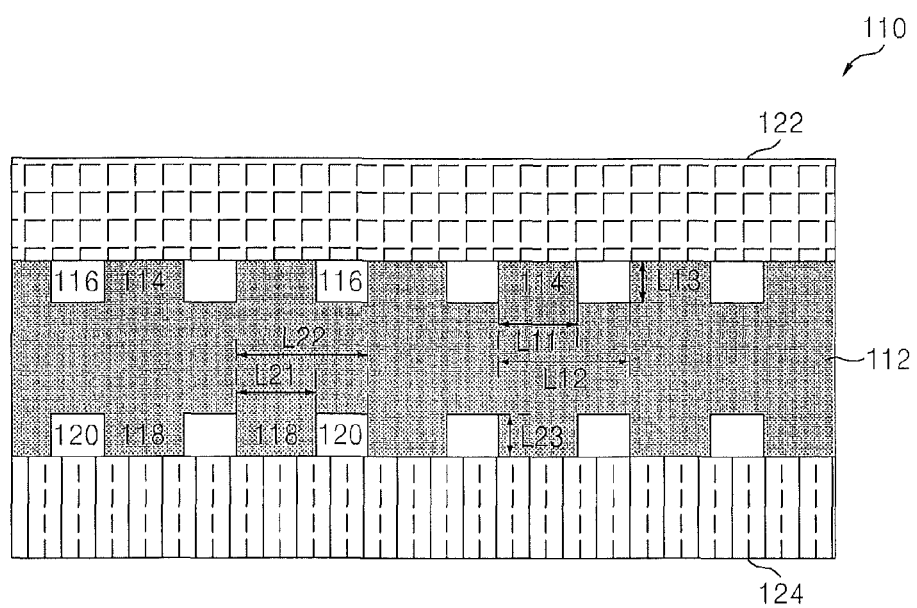
FIG. 4 shows a plan view of the optical modulator structure illustrated in FIG. 3 in some embodiments according to the inventive concept.

FIG. 3 shows a perspective view of an optical modulator structure in some embodiments according to the inventive concept and FIG. 4 shows a plan view of the optical modulator structure illustrated in FIG. 3 in some embodiments according to the inventive concept.

Referring to FIGS. 3 and 4, an optical modulator structure 100, which may included in an optoelectronic device, can include a first semiconductor substrate 102 including silicon Si, a lower cladding layer 104 on an upper surface of the first semiconductor substrate 102, and a second semiconductor substrate 110 formed on a surface the lower cladding layer 104. The lower cladding layer 104 may include $SiO_2$ and the second semiconductor substrate 110 may be Si.

For convenience, FIG. 3 illustrates a mask 101 for forming a plurality of first vertical slabs 114 and a plurality of second vertical slabs 118 in the second semiconductor substrate 110.

Here, a slab means a charge path through which electrons or holes may be injected to an optical waveguide core region.

The plurality of first vertical slabs 114 and the plurality of second vertical slabs 118 may be formed simultaneously, using the mask 101, with a plurality of first through holes 116 and a plurality of second through holes 120, that penetrate the second semiconductor substrate 110.

The second semiconductor substrate 110 includes an optical waveguide core region 112 that is elongated in the direction in which an optical signal is transmitted through the optical modular. The plurality of first vertical slabs 114 are positioned along one side of the optical waveguide core region 112, and the plurality of second vertical slabs 118 are positioned along the opposing side the optical waveguide core region 112.

In some embodiments according to the inventive concept, the upper surface of the optical waveguide core region 112, the upper surfaces of the plurality of first vertical slabs 114, and upper surfaces of the plurality of second vertical slabs 118 are coplanar. Further, in some embodiments according to the inventive concept, a lower surface of the optical waveguide core region 112 (facing the lower cladding layer 104) and the lower surfaces of the plurality of first vertical slabs 114 and lower surfaces of the plurality of second vertical slabs 118 are co-planar.

P-doped regions 122 are positioned in the second semiconductor substrate 110 in contact with the plurality of first vertical slabs 114 opposite the optical waveguide core region 112. N-doped regions 124 are positioned in the second semiconductor substrate 110 in contact with the plurality of second vertical slabs 118 opposite the optical waveguide core region 112. The P-doped regions 122 and the N-doped regions 124 are configured to promote charge flow to/from the plurality of first and second vertical slabs 114 and 118 via the respect electrode thereon (not shown). In some embodiments according to the inventive concept, the plurality of first vertical slabs 114 are doped with a p-type dopant or doping agent, and the plurality of second vertical slabs 118 are doped with a n-type dopant or doping agent.

As illustrated in FIG. 4, in some embodiments according to the inventive concept, the width L11 of ones of the plurality of first vertical slabs 114 can be in a range between about 10 nm and about 1000 nm. In some embodiments according to the inventive concept, the width L21 of ones of the plurality of second vertical slabs 114 can be in a range between about 10 nm and about 1000 nm. Accordingly, the widths of the pluralities of the first and second vertical slabs 114, 118 can be equal to one another.

As illustrated in FIG. 4, in some embodiments according to the inventive concept, ones of the plurality of first vertical slabs 114 can be spaced apart by a distance L12 in a range between about 0.1 μm and about 2.0 μm. In some embodiments according to the inventive concept, ones of the plurality of second vertical slabs 118 can be spaced apart by a distance L22 in a range between about 0.1 μm and about 2.0 μm. Accordingly, the spacing between the pluralities of the first and second vertical slabs 114, 118 can be equal to one another.

As illustrated in FIG. 4, in some embodiments according to the inventive concept, ones of the plurality of first vertical slabs 114 can extend from the doped region 122 into the optical waveguide core region 112 by a distance L13 that can be in a range between about 100 nm to about 1000 nm. In some embodiments according to the inventive concept, ones of the plurality of second vertical slabs 118 can extend from the doped region 124 into the optical waveguide core region 112 by a distance L23 that can be in a range between about 100 nm to about 1000 nm. Accordingly, the extension of the pluralities of the first and second vertical slabs 114, 118 into the optical waveguide core region 112 can be equal to one another.

As illustrated in FIGS. 3 and 4, the plurality of first vertical slabs 114 and the plurality of second vertical slabs 118 can be arranged along opposite sides of the optical waveguide core region 112 directly opposite one another (e.g., in pairs) in a symmetrical pattern. For example, the plurality of first vertical slabs 114 and the plurality of second vertical slabs 118 are equally spaced on both sides of the optical waveguide core region 112 in the elongated direction of the optical transmission path of the optical waveguide core region 112.

Figure 5:
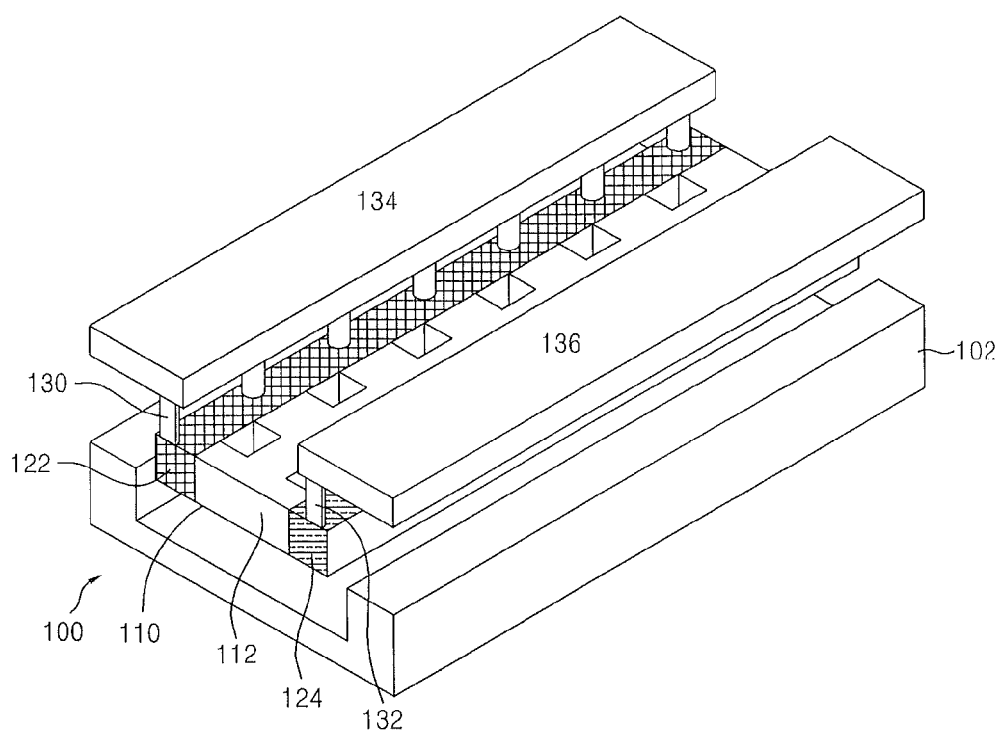
FIG. 5 shows a cross-sectional perspective view of an optical modulator structure along line A-A' in FIG. 3 in some embodiments according to the inventive concept.
Figure 6:
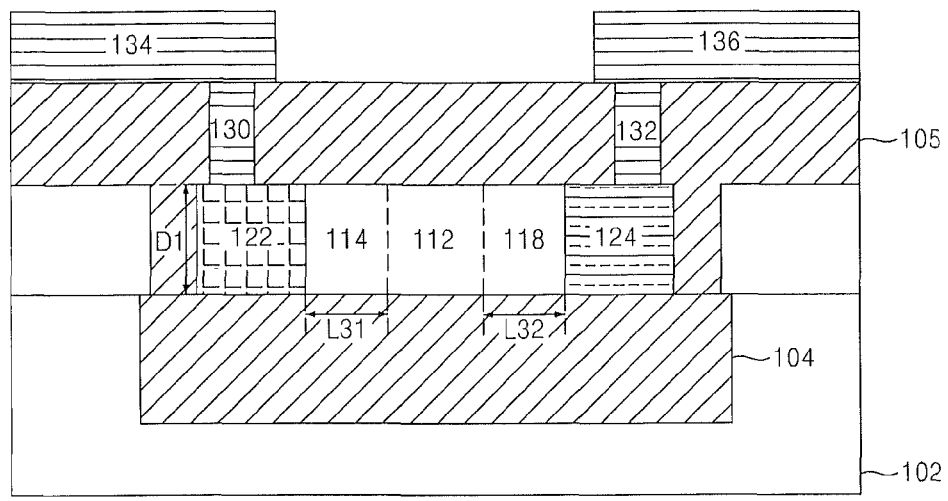
FIG. 6 shows a cross-sectional view of the optical modulator structure illustrated in FIG. 5 in some embodiments according to the inventive concept.

FIG. 5 shows a cross-sectional perspective view of the optical modulator structure illustrated in FIG. 3 taken along direction of A-A'. FIG. 6 shows a cross-sectional view of the optical modulator structure illustrated in FIG. 5.

The optical modulator structure 100 illustrated in FIG. 5 further includes a plurality of first metal electrodes 130 connected to the p-doped region 122 and connected to a first electrode pad 134. A plurality of second metal electrodes 132 are connected to the n-doped region 124 and connected to a second electrode pad 136 (See FIG. 3.) To control a refractive index of the optical waveguide core region 112, the voltage +V is supplied to the first electrode pad 134 and a reference voltage, such as GND, is supplied to the second electrode pad 136. For example, the voltage +V may be a modulated voltage signal configured to vary the refractive index of the optical waveguide core region 112.

It will be understood that the lower cladding layer 104 and the upper cladding layer 105 are not shown in the optical modulator structure 100, for clarity of illustration. However, the lower cladding layer 104 and the upper cladding layer 105 are illustrated, for example, in FIG. 6.

As illustrated in FIG. 6, the height (sometimes referred to as the depth) D1 of the optical waveguide core region 112 and the heights of the plurality of first vertical slabs 114 and the plurality of second vertical slabs 118 are equal, so that the upper and lower surfaces are co-planar with one another. It will be understood that the term "equal" includes exactly equal to and substantially equal to one another within a range determined by a process used to form the elements of the optical modulator structure. In some embodiments according to the inventive concept, the height D1 of the optical waveguide core region 112, the height of the p-doped region 122 and the height of the n-doped region 124 can be equal to each other. In some embodiments according to the inventive concept, the height D1 can be in a range between about 0 nm and about 200 nm.

That is, as illustrated in FIG. 3, since the optical waveguide core region 112, the plurality of first vertical slabs 114 and the plurality of second vertical slabs 118 can be formed simultaneously through a single etching by using the mask 101 the height D1 of the optical waveguide core region 112 can be equal to the heights of the pluralities of first and second vertical slabs 114, 118.

According to FIG. 6, a boundary between the optical waveguide core region 112 and the plurality of first vertical slabs 114, which may be doped with a p-type dopant, is designated as L31 and can be in a range between about 0 nm to about 200 nm. Further, a boundary between the optical waveguide core region 112 and the plurality of second vertical slabs 118, which may be doped with an n-type dopant, is designated as L32, and can be in a range between about 0 nm to about 200 nm. Accordingly, the boundary of where the respective doped portions of the vertical slab begins and the optical waveguide core region 112 ends can be formed anywhere up to about 200 nm toward the optical waveguide core region 112. In some embodiments according to the inventive concept, any doping profile can be used to dope the pluralities of first and second vertical slabs 114, 118, within the distances described herein.

A hole supplied from a power supply may be transmitted to a ground through a p-doped region 122, the first vertical slab 144 (or doped portion), an optical waveguide core region 112, a second vertical slab 118 (or a doped portion), the n-doped region 124. An electron supplied from a ground may be transmitted in an opposite direction to the hole.

Figure 7:
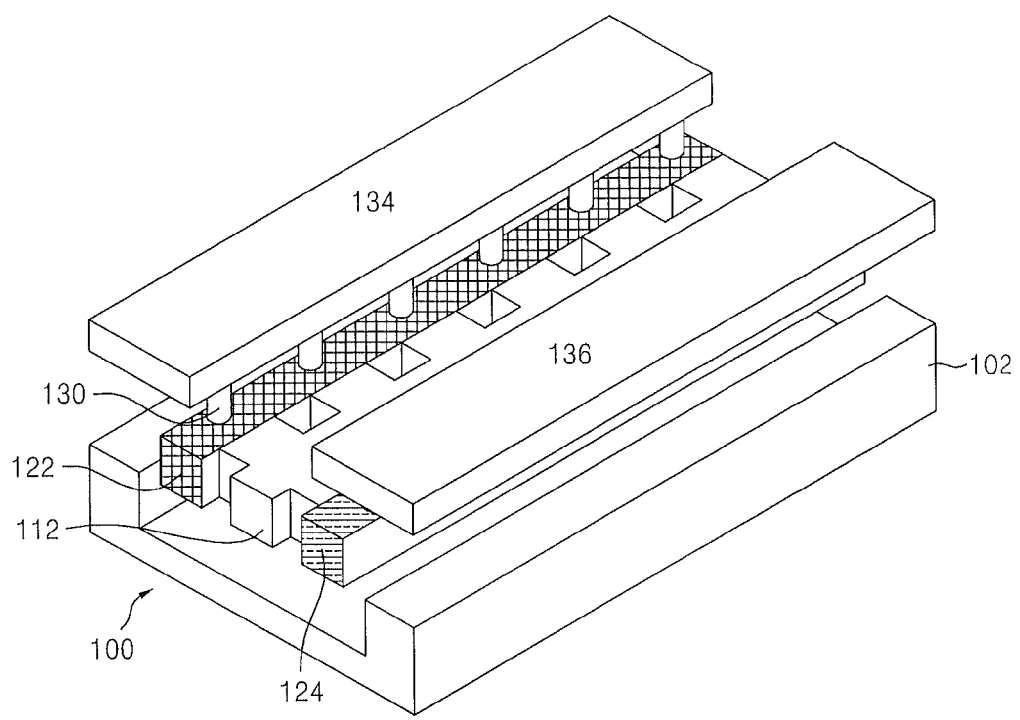
FIG. 7 shows a cross-sectional perspective view of the optical modulator structure along line B-B' in FIG. 3 in some embodiments according to the inventive concept.
Figure 8:
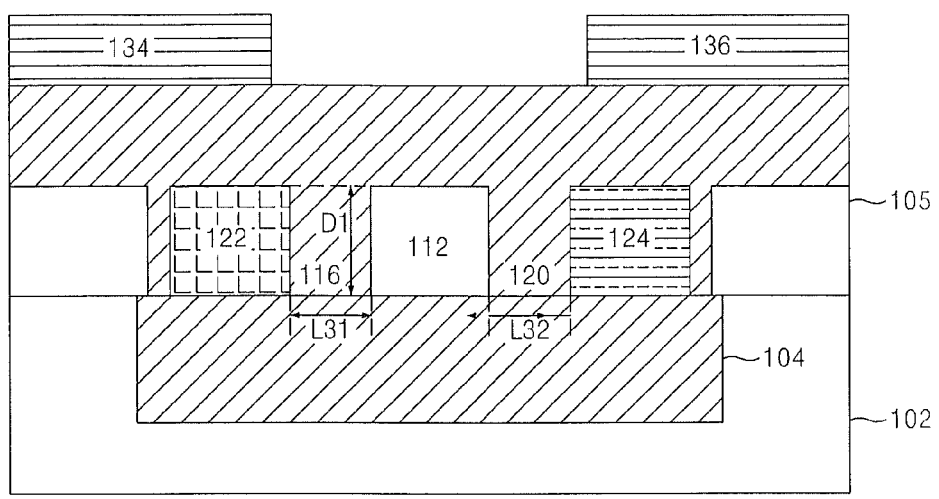
FIG. 8 shows a cross-sectional view of the optical modulator structure illustrated in FIG. 7 in some embodiments according to the inventive concept.

FIG. 7 shows a cross-sectional perspective view of the optical modulator structure illustrated in FIG. 3 taken along B-B', FIG. 8 shows a cross-sectional view of the optical modulator structure illustrated in FIG. 7. It will be understood that the lower cladding layer 104 and the upper cladding layer 105 are not shown in FIG. 7, to further clarify the structure illustrated. However, the lower cladding layer 104 and the upper cladding layer 105 are illustrated together in FIG. 8. As illustrated in FIG. 8, the heights (or depth) D1 of the optical waveguide core region 112, the pluralities of the first and second vertical slabs 114, 118 are equal to each other (See also FIG. 6).

Figure 9:
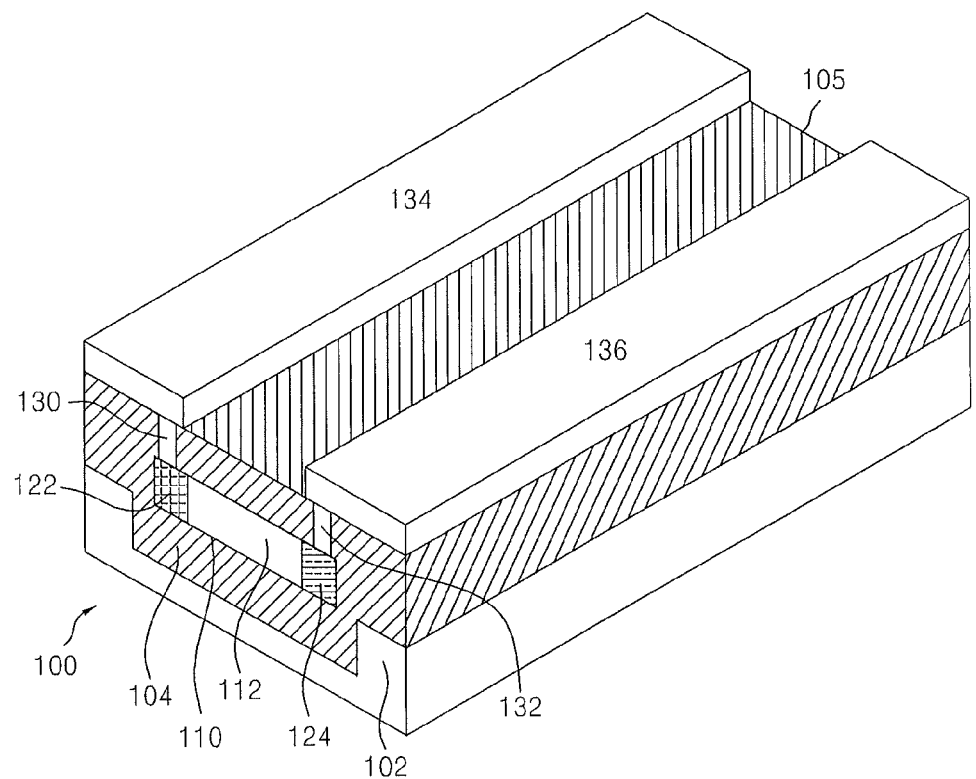
FIG. 9 shows a perspective view of the optical modulator structure illustrated in FIG. 5 including a lower cladding layer and an upper cladding layer in some embodiments according to the inventive concept.

FIG. 9 shows a perspective view of the optical modulator structure illustrated in FIG. 5 including the lower cladding layer and the upper cladding layer. The optical modulator structure 100 illustrated in FIG. 9 includes the lower cladding layer 104 and the upper cladding layer 105 surrounding the second semiconductor substrate 110.

Figure 10:
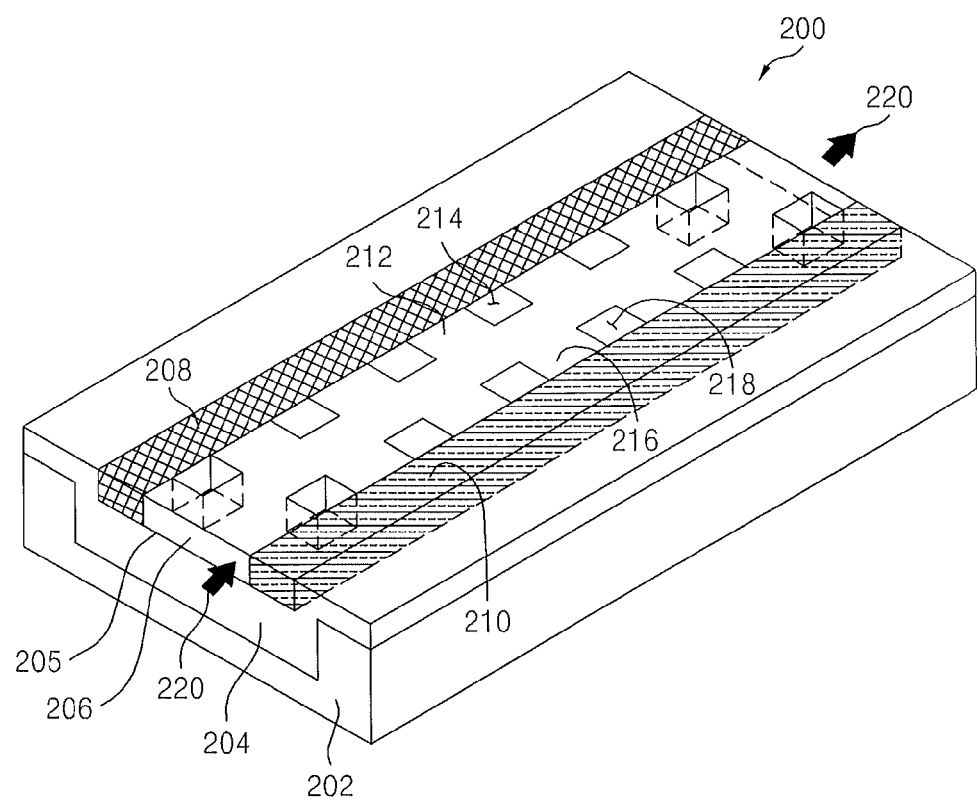
FIG. 10 shows a perspective view of an optical modulator structure in some embodiments according to the inventive concept.
Figure 11:
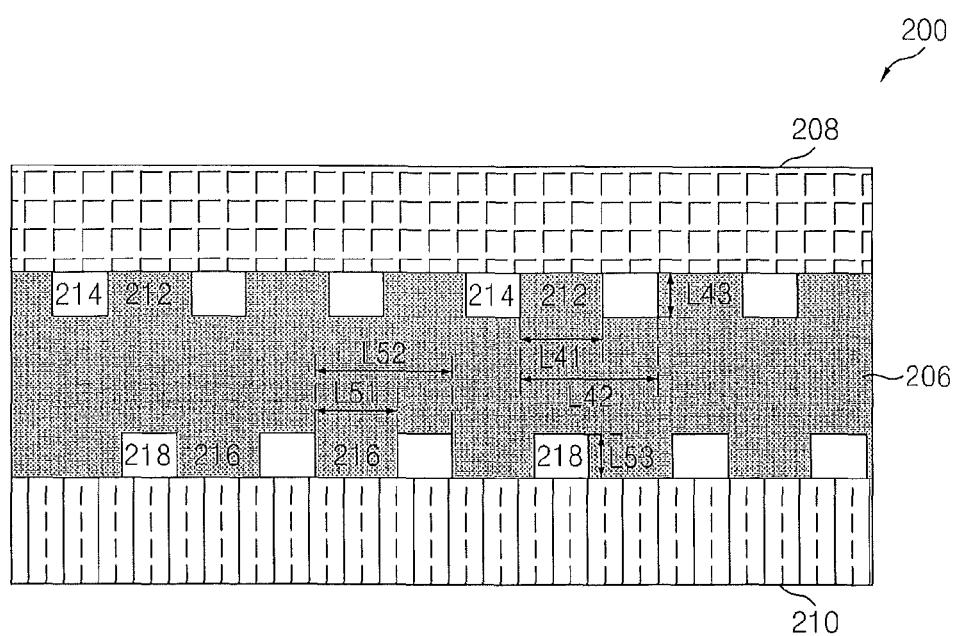
FIG. 11 shows a plan view of the optical modulator structure illustrated in FIG. 10 in some embodiments according to the inventive concept.

FIG. 10 shows a perspective view of an optical modulator structure in some embodiments according to the inventive concept, and FIG. 11 shows a plan view of the optical modulator structure illustrated in FIG. 10. Referring to FIGS. 10 and 11, an optical modulator structure 200 which may be included in an optoelectronic device includes a first semiconductor substrate 202 comprising silicon Si, a lower cladding layer 204 on an upper surface of the first semiconductor substrate 202, and a second semiconductor substrate 205 on the lower cladding layer 204.

A plurality of first vertical slabs 212 and a plurality of second vertical slabs 216 may be formed simultaneously using a single mask as illustrated in FIG. 3. A plurality of first through holes 214 and a plurality of second through holes 218 may also be formed simultaneously on the second semiconductor substrate 205, along with the pluralities of the first and second vertical slabs 212, 216.

The second semiconductor substrate 205 includes an optical waveguide core region 206 that is elongated in the direction in which an optical signal 220 is transmitted. The plurality of first vertical slabs 212 are positioned along one side of the optical waveguide core region 206 and the plurality of second vertical slabs 216 are positioned along the other side of the optical waveguide core region 206. A p-doped region 208 is in contact with the plurality of first vertical slabs 212 and an n-doped region 210 is in contact with the plurality of second vertical slabs 210, both of which are opposite the optical waveguide core region 206.

As illustrated in FIG. 11, in some embodiments according to the inventive concept, a width L41 of ones of the plurality of first vertical slabs 212 can be in a range between about 10 nm and about 1000 nm. In some embodiments according to the inventive concept, the width L51 of ones of the plurality of second vertical slabs 216 can be in a range between about 10 nm and about 1000 nm. Accordingly, the widths of the pluralities of the first and second vertical slabs 212, 216 can be equal to one another.

As illustrated in FIG. 11, in some embodiments according to the inventive concept, ones of the plurality of first vertical slabs 216 can be spaced apart by a distance L42 in a range between about 0.1 µm and about 2.0 µm. In some embodiments according to the inventive concept, ones of the plurality of second vertical slabs 216 can be spaced apart by a distance L52 in a range between about 0.1 µm and about 2.0 µm. Accordingly, the spacing between the pluralities of the first and second vertical slabs 212, 216 can be equal to one another.

As illustrated in FIG. 11, in some embodiments according to the inventive concept, ones of the plurality of first vertical slabs 212 can extend from the doped region 208 into the optical waveguide core region 206 by a distance L43 that can be in a range between about 100 nm to about 1000 nm. In some embodiments according to the inventive concept, ones of the plurality of second vertical slabs 216 can extend from the doped region 210 into the optical waveguide core region 206 by a distance L53 that can be in a range between about 100 nm to about 1000 nm. Accordingly, the extension of the pluralities of the first and second vertical slabs 212, 216 into the optical waveguide core region 206 can be equal to one another.

Each of the plurality of first vertical slabs 212 may be doped with a p-type dopant, and each of the plurality of second vertical slabs 216 may be doped with a n-type dopant.

According to FIG. 11, a boundary between the optical waveguide core region 206 and the plurality of first vertical slabs 212, which may be doped with a p-type dopant, can be in a range between about 0 nm to about 200 nm. Further, a boundary between the optical waveguide core region 206 and the plurality of second vertical slabs 216, which may be doped with an n-type dopant, can be in a range between about 0 nm to about 200 nm. Accordingly, the boundary of where the respective vertical slab begins and the optical waveguide core region 112 ends can be formed anywhere up to about 200 nm toward the optical waveguide core region 112. In some embodiments according to the inventive concept, any doping profile can be used to dope the pluralities of first and second vertical slabs 212, 216, within the ranges described herein As further illustrated in FIGS. 10 and 11, each of the plurality of first vertical slabs 212 and the plurality of second vertical slabs 216 are arranged asymmetrically relative to one another even though the pluralities of the first and second slabs have the same spacing. For example, the plurality of first vertical slabs 212 and the plurality of second vertical slabs 216 can be offset relative to one another extending along the direction of transmission of the optical signal.

In some embodiments according to the inventive concept, the optical modulator structure 200 as illustrated in FIG. 10, may reduce the influence of each of the first and second vertical slabs 212 and 216, on the optical waveguide core region 206, so that losses for the optical signal transmitted through the optical waveguide core region 206 may be reduced.

Figure 12:
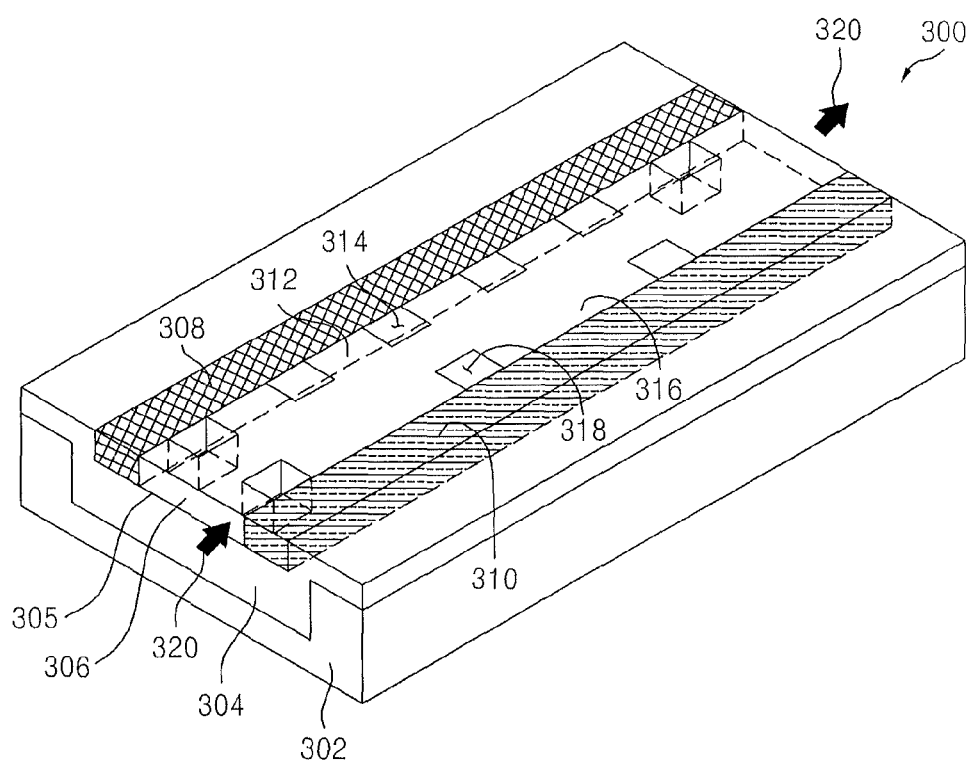
FIG. 12 shows a perspective view of an optical modulator structure in some embodiments according to the inventive concept.
Figure 13:
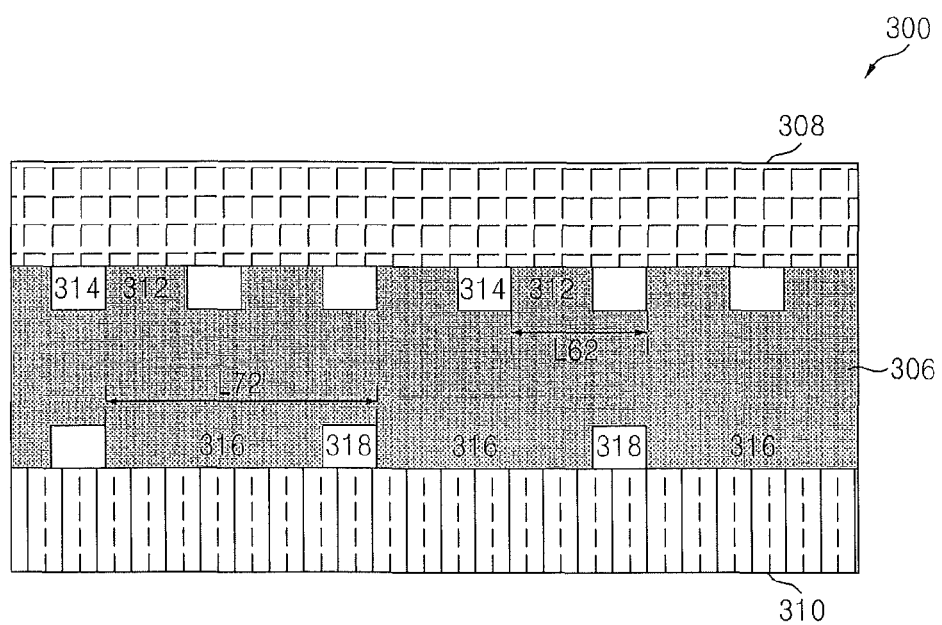
FIG. 13 shows a plan view of the optical modulator structure illustrated in FIG. 12 in some embodiments according to the inventive concept.

FIG. 12 shows a perspective view of an optical modulator structure in some embodiments according to the inventive concept. FIG. 13 shows a plan view of the optical modulator structure illustrated in FIG. 12.

Referring to FIGS. 12 and 13, an optical modulator structure 300, which can be included in an optoelectronic device, includes a first semiconductor substrate 302 comprising silicon Si, a lower cladding layer 304 formed on the first semiconductor substrate 302, and a second semiconductor substrate 305 on the lower cladding layer 304.

A plurality of first vertical slabs 312 and a plurality of second vertical slabs 316 may be formed simultaneously using the mask described in FIG. 3. A plurality of first through holes 314 and a plurality of second through holes 318 may also be formed simultaneously on the second semiconductor substrate 305 along with the plurality of first and second vertical slabs 312, 316.

The second semiconductor substrate 305 includes an optical waveguide core region 306 for transmitting an optical signal 320. The plurality of first vertical slabs 312 are positioned along one side of the optical waveguide core region 306 and the plurality of second vertical slabs 316 are positioned along the other side of the optical waveguide core region 306, opposite the plurality of first vertical slabs 312. A p-doped region 308 is in contact with the plurality of first vertical slabs 312 and an n-doped region 310 is in contact with the plurality of second vertical slabs 316, both of which are opposite the optical waveguide core region 306.

In some embodiments according to the inventive concept, a width and a length of ones of the plurality of first vertical slabs 312 illustrated in FIG. 13, are equal to a width and a length of ones of the plurality of first vertical slabs 114 illustrated in FIG. 4. A width and a length of each of the plurality of second vertical slabs 316 illustrated in FIG. 13 can be equal to a width and a length of each of the plurality of second vertical slabs 118 illustrated in FIG. 4.

In some embodiments according to the inventive concept, the plurality of first vertical slabs 312 are spaced apart by a distance L62, which can be a range between about 10 nm to about 1000 nm. In some embodiments according to the inventive concept, the plurality of second vertical slabs 316 are spaced apart by a distance L72, which is greater than the distance L72, which can be in a range between about 10 nm and about 1000 nm.

As illustrated in FIG. 12, the plurality of first vertical slabs 312 are spaced-apart by the distance L62, which is different from the spacing distance L72 for the plurality of second vertical slabs 316. Accordingly in some embodiments according to the inventive concept, the optical modulator structure 300 may adjust the densities of electrons and holes which are asymmetrically injected into the optical waveguide core region 306, due to the asymmetric arrangement of the pluralities of the first and second vertical slabs 312, 316.

According to FIGS. 12 and 13, a boundary between the optical waveguide core region 306 and the plurality of first vertical slabs 312, which may be doped with a p-type dopant, can be in a range between about 0 nm to about 200 nm. Further, a boundary between the optical waveguide core region 306 and the plurality of second vertical slabs 316, which may be doped with an n-type dopant, can be in a range between about 0 nm to about 200 nm. Accordingly, the boundary of where the respective vertical slab begins and the optical waveguide core region 306 ends can be formed anywhere up to about 200 nm toward the optical waveguide core region 306. In some embodiments according to the inventive concept, any doping profile can be used to dope the pluralities of first and second vertical slabs 312, 316, within the ranges described herein FIG. 14 shows a block diagram of an optoelectronic device 400 including the optical modulator structure illustrated in FIG. 3, 10 or 12 in some embodiments according to the inventive concept.

Figure 14:
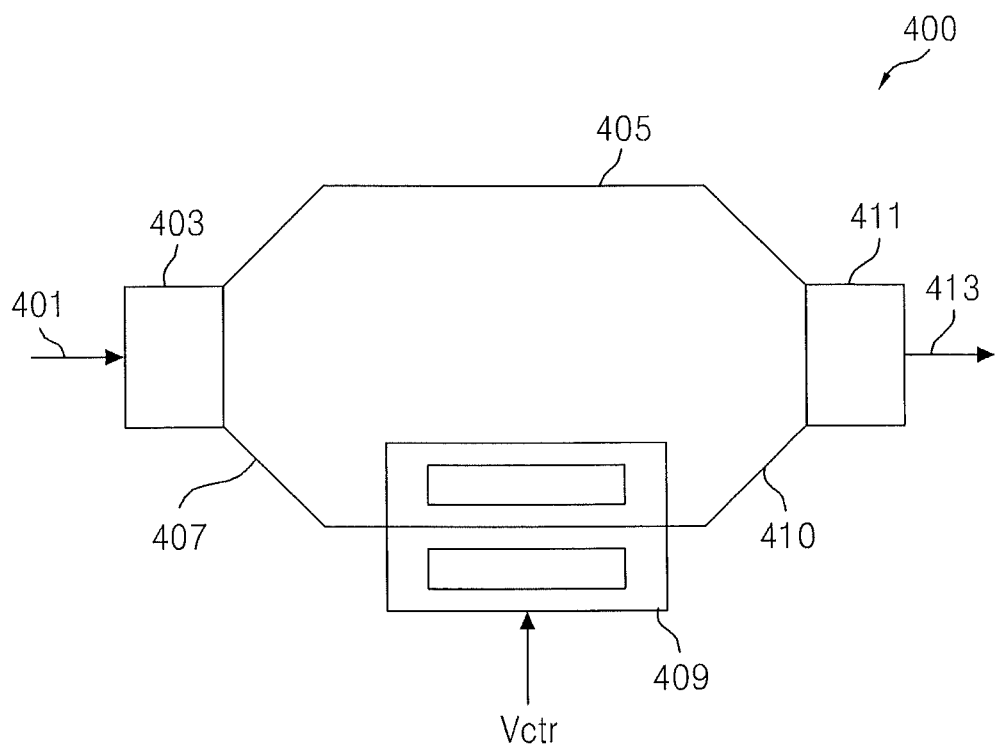
FIG. 14 shows a block diagram of an optical modulator structure illustrated in FIGS. 3-12 coupled to other components in some embodiments according to the inventive concept.

Referring to FIG. 14, the optoelectronic device 400 includes an optical splitter 403, a optical modulator structure 409, and an optical coupler 411. The optoelectronic device 400 may be a Mach-Zehnder Interferometer (MZI).

The optical splitter 403 splits an un-modulated optical signal 401 into an un-modulated first optical signal 405 and an un-modulated second optical signal 407.

The optical modulator structure 409, according to, for example, the embodiments illustrated in FIG. 3, 5, 10 or 12, generates a phase-modulated optical signal 410 by modulating a phase of the un-modulated second optical signal 407 responsive to a control voltage Vctr. The control voltage Vctr and GND, supplied to an optical modulator structure 409 can control an electrical to optical conversion.

The optical coupler 411 combines the un-modulated first optical signal 405 and the phase-modulated optical signal 410, and generates an output optical signal 413, which can combine either constructively or destructively.

Figure 15:
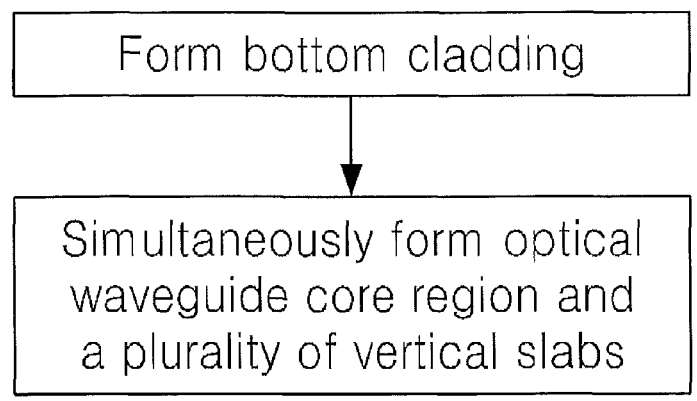
FIG. 15 shows a flow chart illustrating methods of forming the optical modulator structure illustrated, for example, in FIGS. 3-12 in some embodiments according to the inventive concept.
Figure 16:
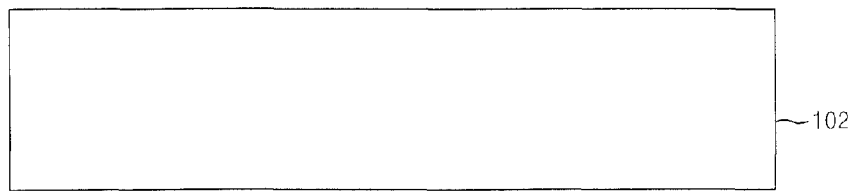
FIGS. 16 to 23 show methods of forming the optical modulator structure illustrated, for example, in FIG. 9 in some embodiments according to the inventive concept.

FIG. 15 is a flowchart illustrating methods of forming an optical modulator structure in some embodiments according to the inventive concept, as illustrated in FIGS. 3, 5, 10 and/or 12.

Referring to FIGS. 3, 5, 10, 12 and/or 15, a lower cladding layer 104, 204 or 304 is formed by etching a first semiconductor substrate 102, 202 or 302 (S10).

By etching a second semiconductor substrate 110, 205 or 305 formed on the lower cladding layer 104, 204 or 304, using a single mask, at least one pair of vertical slabs 114 and 118, 212 and 216 or 312 and 316 and an optical waveguide core region 112, 206 or 306 arranged between the at least one pair of slabs may be formed at the same time (S20) to form a unitary structure thereof.

Each thickness (or height) of the at least one pair of slabs is equal to a thickness (or height) of the optical waveguide core region.

It will be understood that, depending on the particular arrangement of the mask, the at least one pair of slabs 114 and 118 may be arranged to have the relationships illustrated in FIG. 3 or the at least one pair of slabs 212 and 216 may be arranged relative to one another as shown in FIG. 10.

FIGS. 16 to 23 show methods of forming the optical modulator structure illustrated in, for example FIG. 9, and is described in reference to FIGS. 8, 9, and 16 to 23 in some embodiments according to the inventive concept.

Figure 17:
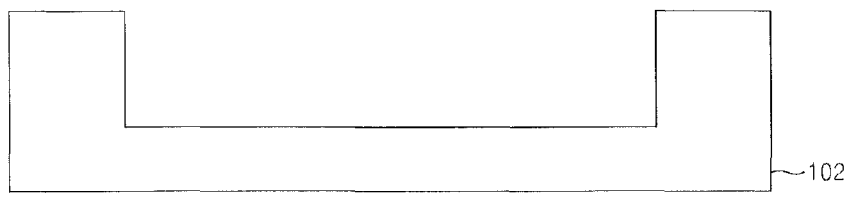
Figure 18:
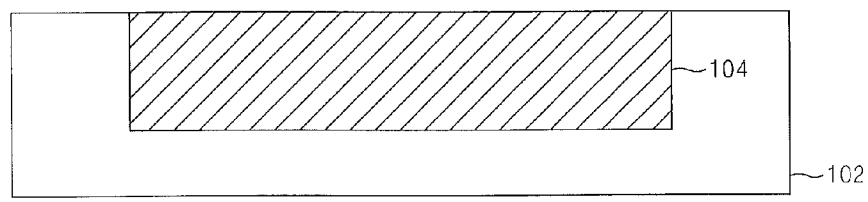
Figure 19:
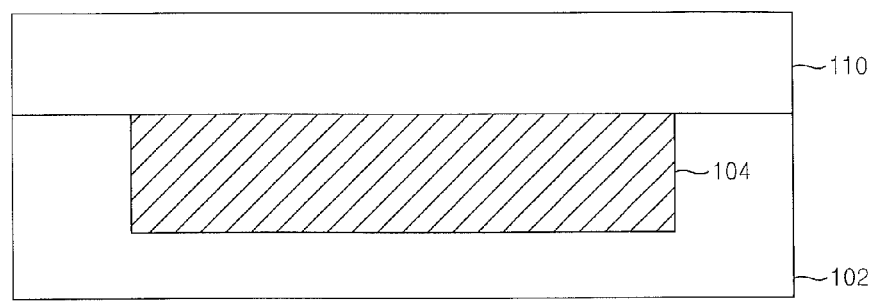
Figure 20:
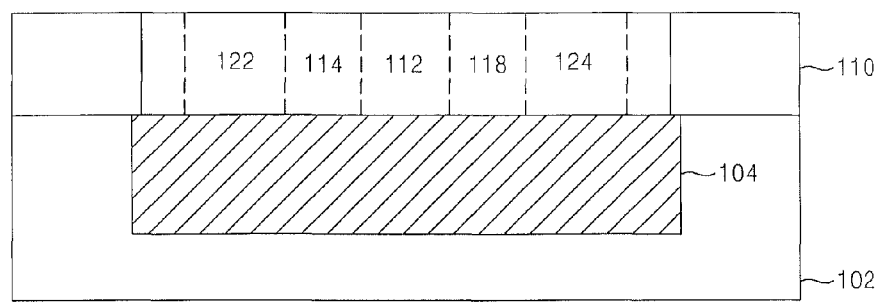

The first semiconductor substrate 102 is provided (FIG. 16), and the surface of the first semiconductor substrate 102 is etched to form a trench (FIG. 17). The lower cladding layer 104, such as $SiO_2$, is formed or deposited in the trench (FIG. 18). Amorphous silicon is formed and crystallized on the first semiconductor substrate 102 and on the lower cladding layer 104 to provide the second semiconductor substrate 110 (FIG. 19).

The second semiconductor substrate 110 is patterned to simultaneously define an optical waveguide core region pattern along with patterns for the pluralities of first and second vertical slabs. The patterning can also define patterns for pluralities of first and second conductive regions that are outside the core region and contact the respective one of the plurlaities of first and second vertical slabs on the second semiconductor substrate 110.

Figure 21:
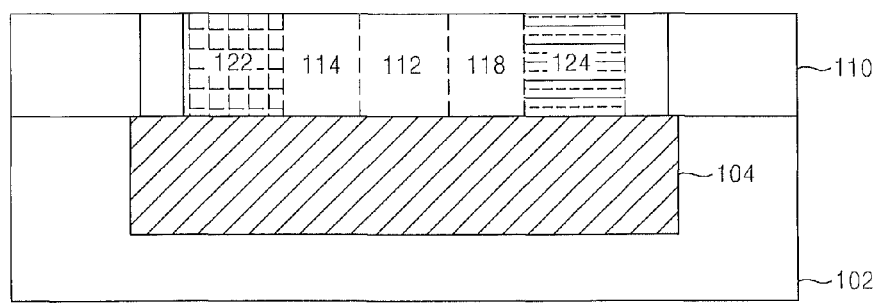
Figure 22:
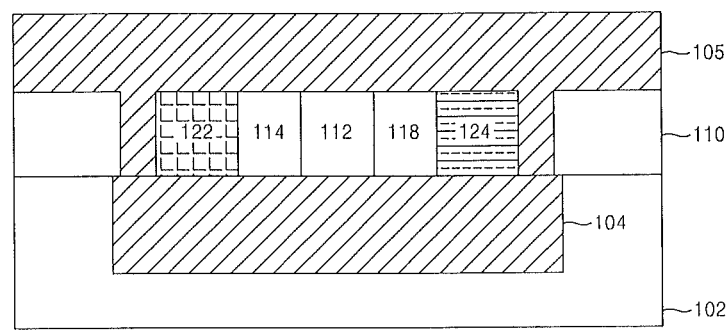
Figure 23:
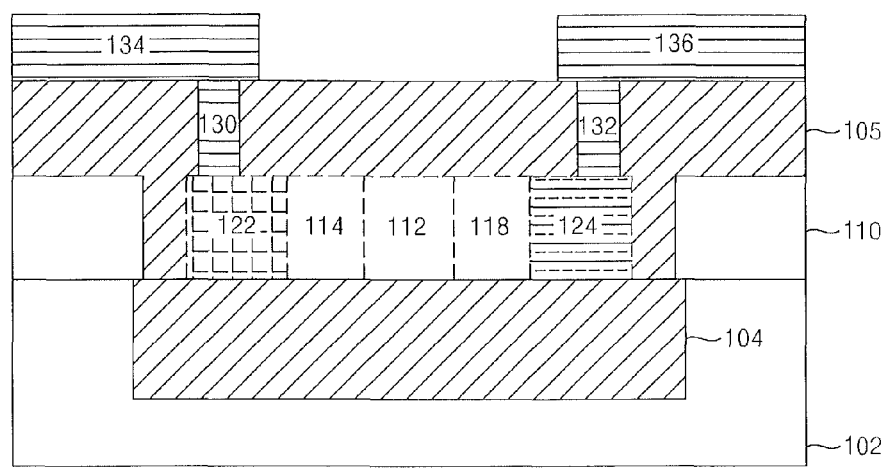

The second semiconductor substrate 110 (including the patterns described above) is etched (FIG. 20) to simultaneously form an optical modulator structure including the optical waveguide core region 112 and the plurality of first and second vertical slabs 114 and 118, as a unitary structure, along with the pluralities of first and second conductive regions. The first conductive regions are doped, with a p-type dopant, to form p-doped regions 122, and the second conductive regions are doped, using an n-type dopant, to form n doped regions 124 in the second semiconductor substrate 110 (FIG. 21).

The upper cladding layer 105 is deposited on the second semiconductor substrate 110 (FIG. 22), and is then etched to to form contact recesses that expose the p-doped regions 122 and the n-n-doped regions 124. Conductive material is deposited in the contact recesses to form first contacts 130 connected to the p-doped regions 122, and to form second metal contacts 132 connected to the n-doped regions 124.

First electrode pads 134 are formed on the surface of the upper cladding layer 105 connected to the first contacts and second electrode pads 136 are formed on the surface of the upper cladding layer 105 connected to the second contacts.

Although embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed:

1. An optical modulator structure comprising:
   a core region comprising an optical transmission path having a refractive index that is modulated via electric charge introduced into the core region;
   a plurality of first vertical slabs contacting and spaced along a first side of the core region to provide a first path for the electric charge to/from the core region; and
   a plurality of second vertical slabs contacting and spaced along a second side of the core region, opposite the first side, to provide a second path for the electric charge to/from the core region.

2. The structure of claim 1 wherein an upper surface of the core region and upper surfaces of the pluralities of first and second vertical slabs are co-planar.

3. The structure of claim 1 wherein a lower surface of the core region and lower surfaces of the pluralities of first and second vertical slabs are co-planar.

4. The structure of claim 1 wherein the plurality of first vertical slabs are spaced apart along the first side of the core region at a first spacing and the plurality of second vertical slabs are spaced apart along the second side of the core region at a second spacing that is equal to the first spacing.

5. The structure of claim 1 wherein the plurality of first vertical slabs are spaced apart along the first side of the core region at a first spacing and the plurality of second vertical slabs are spaced apart along the second side of the core region at a second spacing that is different than the first spacing.

6. The structure of claim 1 wherein the core region is elongated in a first direction along the optical transmission path and the vertical slabs extend along the first and second sides in a vertical direction that is perpendicular to the first direction.

7. The structure of claim 1 wherein upper surfaces of the pluralities of first and second vertical slabs and an upper surface of the core region is co-planar.

8. The structure of claim 7 wherein a thickness of the pluralities of first and second vertical slabs is about 0 nm to about 200 nm.

9. The structure of claim 1 wherein immediately adjacent edges of the plurality of first vertical slabs are spaced apart by about 10 nm to about 1000 nm and immediately adjacent edges of the plurality of second vertical slabs are spaced apart by about 10 nm to about 1000 nm.

10. The structure of claim 1 wherein the vertical slabs extend from p or n doped regions in direct contact with the sides of the core region into the core region by about 100 nm to about 1000 nm.

11. An optical modulator structure comprising
   a plurality of vertical slabs configured to inject charge into a core region located between ones of the plurality of vertical slabs, both formed as a single unitary structure, wherein immediately adjacent ones of the plurality of vertical slabs located on a first side of the core region are separated from one another by an insulator.

12. The structure of claim 11 wherein the plurality of vertical slabs comprises a plurality of first vertical slabs on a first side of the core region and a plurality of second vertical slabs on a second side of the core region opposite the first side.

13. The structure of claim 12 wherein the plurality of first vertical slabs are spaced apart along a side of the core region at a first spacing and the plurality of second vertical slabs are spaced apart along a side of the core region at a second spacing that is different than the first spacing.

14. The structure of claim 12 wherein the plurality of first vertical slabs are spaced apart along a side of the core region at a first spacing and the plurality of second vertical slabs are spaced apart along a side of the core region at a second spacing that is equal to the first spacing.

15. The structure of claim 12 wherein the plurality of first vertical slabs and the plurality of second vertical slabs are arranged symmetrically or asymmetrically to one another along the core region.

16. The structure of claim 11 wherein an upper surface of the core region and upper surfaces of the plurality of vertical slabs are co-planar.

17. The structure of claim 11 wherein a lower surface of the core region and lower surfaces of the plurality of vertical slabs are co-planar.

18. The structure of claim 11 wherein the insulator extends between the vertical slabs from an upper surface of the vertical slabs to a lower surface of the vertical slabs.

19. The structure of claim 11 wherein the plurality of vertical slabs are doped.

20. The structure of claim 11 wherein the core region is elongated in a first direction along an optical transmission path and the vertical slabs extend along first and second opposing sides of the core region in a vertical direction that is perpendicular to the first direction.

21. A method of forming an optical modulator structure comprising:
   simultaneously forming a core region, and pluralities of first and second vertical slabs, wherein the core region comprises an optical transmission path having a refractive index that is modulated via electric charge introduced into the core region;
   wherein the plurality of first vertical slabs contacts and are spaced along a first side of the core region to provide a first path for the electric charge to/from the core region; and
   wherein the plurality of second vertical slabs contacts and are spaced along a second side of the core region, opposite the first side, to provide a second path for the electric charge to/from the core region.

22. A method of forming an optical modulator structure comprising:
   forming a trench in a substrate;
   forming a lower cladding layer in the trench;
   depositing an amorphous Si layer on the lower cladding layer;
   patterning the amorphous Si layer using a single mask to simultaneously define a core region pattern and pluralities of first and second vertical slab patterns on the amorphous Si layer;
   etching the amorphous Si layer to form a core region and a plurality of first vertical slabs on a first side of the core region and a plurality of second vertical slabs on a second side of the core region opposite the first side; and
   depositing an upper cladding layer on the core region and on the pluralities of first and second vertical slabs.

23. The method according to claim 22 wherein patterning the amorphous Si layer using a single mask further comprises:

patterning the amorphous Si layer using the single mask to simultaneously define the core region pattern, the pluralities of first and second vertical slab patterns, and a plurality of conductive region patterns outside the core region pattern in contact with first and second vertical slab patterns on the amorphous Si layer.

24. The method according to claim 23 wherein etching further comprises:

etching the amorphous Si layer to form the core region and the plurality of first vertical slabs on the first side of the core region and the plurality of second vertical slabs on the second side of the core region opposite the first side and to form a plurality of first conductive regions outside the core region pattern in contact with the plurality of first vertical slabs and a plurality of second conductive regions outside the core region pattern in contact with the plurality of second vertical slabs.

25. The method according to claim 24 further comprising:

doping the plurality of first conductive regions with a first type of dopant to form a plurality of first doped regions in contact with the plurality of first vertical slabs; and doping the plurality of second conductive regions with a second type of dopant to form a plurality of second doped regions in contact with the plurality of second vertical slabs.

26. The method according to claim 25 further comprising:

etching the upper cladding layer to expose the pluralities of first and second doped regions to form contact recesses;

depositing conductive material in the contact recesses to form a plurality of first contacts electrically coupled to the plurality of first doped regions and a plurality of second contacts electrically coupled to the plurality of second doped regions;

forming a first electrode pad on the upper cladding layer electrically coupled to the plurality of first contacts; and forming a second electrode pad on the upper cladding layer electrically coupled to the plurality of second contacts.

27. The method according to claim 22 wherein an upper surface of the core region and upper surfaces of the pluralities of first and second vertical slabs are co-planar.

28. The method according to claim 22 wherein the plurality of first vertical slabs are spaced apart along the first side of the core region at a first spacing and the plurality of second vertical slabs are spaced apart along the second side of the core region at a second spacing that is equal to the first spacing.

29. The method according to claim 22 wherein the plurality of first vertical slabs are spaced apart along the first side of the core region at a first spacing and the plurality of second vertical slabs are spaced apart along the second side of the core region at a second spacing that is different than the first spacing.

30. The method according to claim 22 wherein the core region and the pluralities of first and second vertical slabs are formed as a single unitary structure.

* * * * *